8083X
H. Pierce
Bridle Bit.
Patented Mar. 15, 1834.
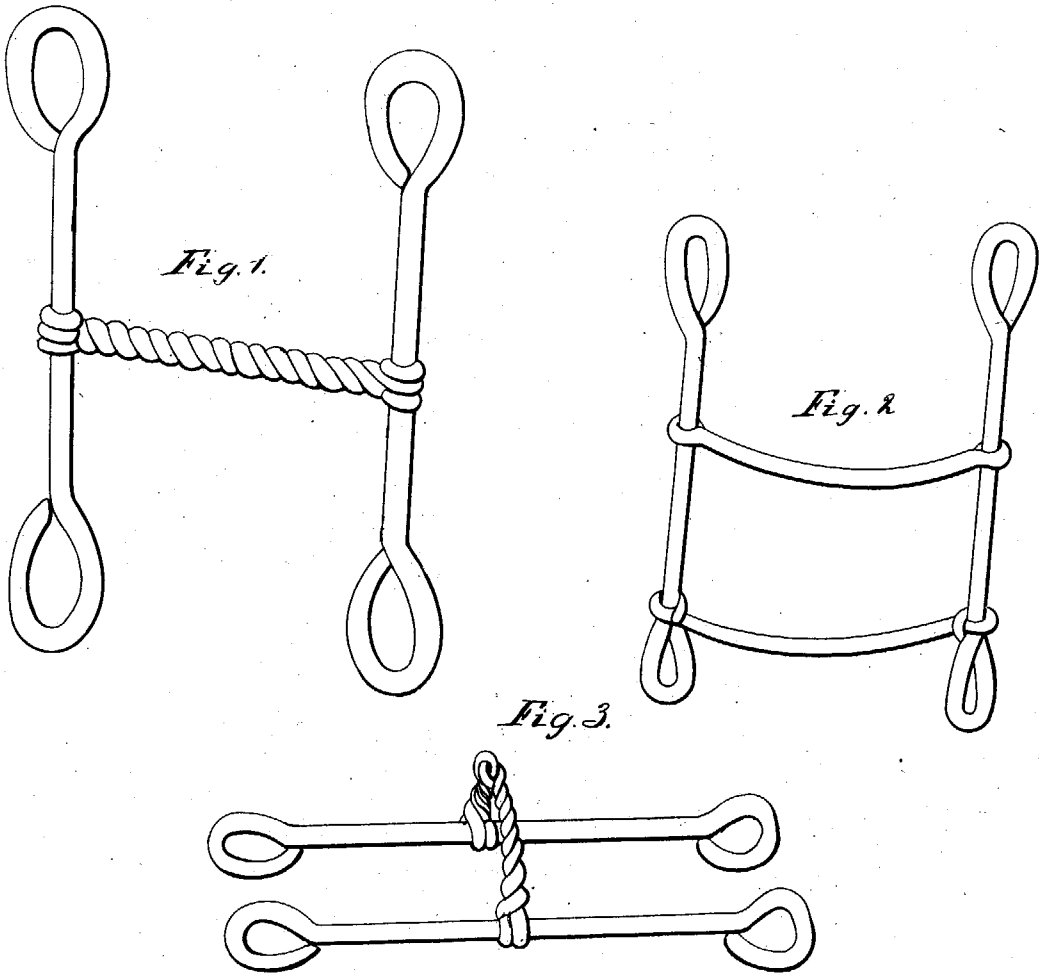
N. PETERS, PHOTO-LITHOGRAPHER, WASHINGTON, D. C.

Mar. 15. 1834 157

Henry Pierce Sharon Conn.

Letters Patent

8083X

The Schedule referred to in these Letters Patent and making part of the same Containing a description in the words of the said Henry Pierce himself of his improvement in the Manufacture of Bridle Bits To all to whom these presents shall come Be it known that I Henry Pierce of Sharon in the County of Litchfield and State of Connecticut have invented a new and useful improvement in Manufacturing of Bridle bits and that the following is a full and exact description of the construction and Manufacture of said Bridle bit as invented by me viz. Said Bridle bit is made of wire of any suitable size with or without a joint in the Centre, the wire to be cut into four pieces, two of which and of equal length forms the Cheeks or Side piece the other two of equal length are twisted together and wound at each end on to the Cheek or Side pieces and forming the Centre or Mouth piece of the bit if a joint is made in the middle of the bit then each mouth piece is wound at each end on to the same cheek or side pieces being twisted and wound to the Centre of the mouth piece, and there forms a joint in the Centre of the mouth piece. But if there is no joint in the bit then the wires forming the mouth piece of the bit are twisted together and fastened or wound at each end onto the Cheeks or Side pieces. The Cheeks or Side pieces are formed by a piece of wire with Circles or loops formed on each end and on which the ends of the mouth pieces are wound and also forming a loop or nearly a Circle in the Centre for the bridle rein. To form a Curb-bit the sides or Cheek pieces are formed in the same manner only enough longer to form the loops at each end and then fastened under the winding of the mouth pieces Witnesses
Ambrose S. Sterling
Ansel Sterling Henry Pierce Exd. [illegible]

Drawing

4 W 83